United States Patent [19]

Suzuki

[11] Patent Number: 5,345,348
[45] Date of Patent: Sep. 6, 1994

[54] CONTROLLING THE MOVING SPEED OF A MAGNETIC HEAD BY VARYING THE GAIN IN RESPONSE TO THE SIGN OF THE ERROR SIGNAL

[75] Inventor: Hiroshi Suzuki, Tokyo, Japan

[73] Assignee: Kabushiki Kaisha Toshiba, Kawasaki, Japan

[21] Appl. No.: 723,439

[22] Filed: Jun. 28, 1991

[30] Foreign Application Priority Data

Jun. 29, 1990 [JP] Japan ................................ 2-173079

[51] Int. Cl.$^5$ ............................................. G11B 5/596
[52] U.S. Cl. ............................. 360/78.07; 360/78.06; 360/78.04; 369/44.29
[58] Field of Search ............... 360/78.06, 78.04, 78.07; 318/560, 561, 616, 618, 619; 369/44.28, 32, 44.29, 44.36

[56] References Cited

U.S. PATENT DOCUMENTS

| | | | |
|---|---|---|---|
| 3,883,894 | 5/1975 | Johnson | 360/78.06 |
| 4,200,827 | 4/1980 | Oswald | 318/616 X |
| 4,314,291 | 2/1982 | Ooa et al. | 360/78.07 |
| 4,794,469 | 12/1988 | Kaida et al. | 360/46 |
| 4,965,501 | 10/1990 | Hashimoto | 360/78.07 X |
| 5,189,571 | 2/1993 | Murphy et al. | 360/78.07 X |

FOREIGN PATENT DOCUMENTS 1-46939 10/1989 Japan .

*Primary Examiner*—Aristotelis Psitos
*Assistant Examiner*—James T. Wilson
*Attorney, Agent, or Firm*—Finnegan, Henderson, Farabow, Garrett & Dunner

[57] ABSTRACT

In an apparatus for controlling a moving speed of a magnetic head, servo data previously recorded on a recording medium is read out during the movement of the magnetic head. A moving speed value of the magnetic head is computed on the basis of position data (representing the current position of the magnetic head) produced from the read out servo data, and a target speed value corresponding to a distance between the current position of the magnetic head and target track position is computed. The moving speed value is subtracted from the target speed value to obtain a differential speed value. The speed of the magnetic head is thus controlled in accordance with whether the differential speed value is positive or negative. Further, a target speed value corresponding to the elapsed time from the start of the movement of the magnetic head is computed, and the moving speed value is subtracted from the target speed value to obtain a differential speed value. The speed of the magnetic head is thus controlled based on the two differential speed values.

2 Claims, 9 Drawing Sheets

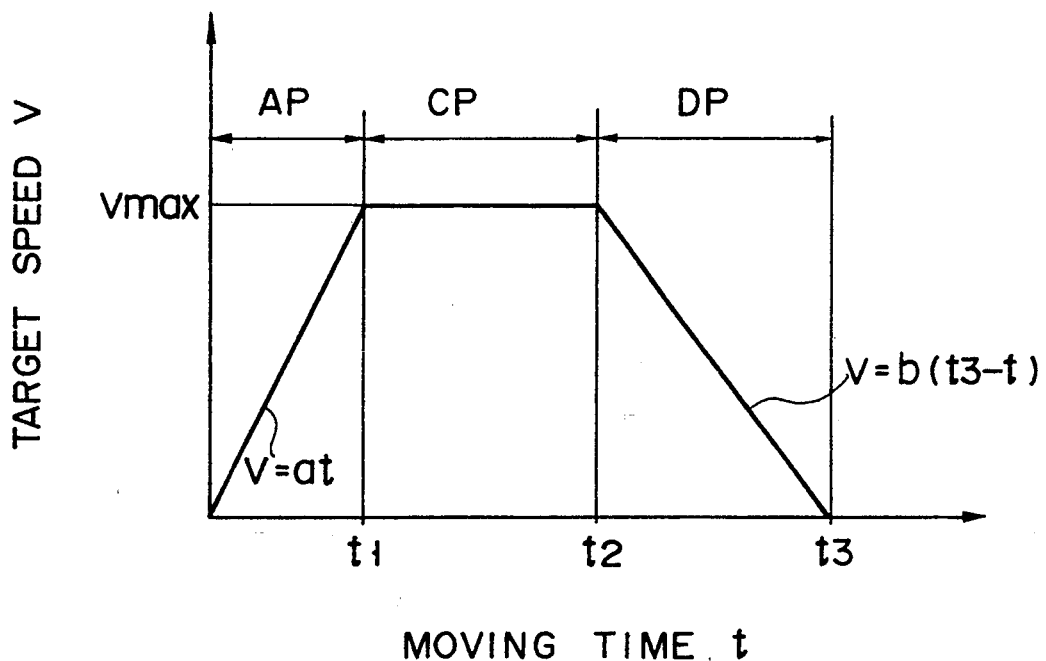
F I G. 1
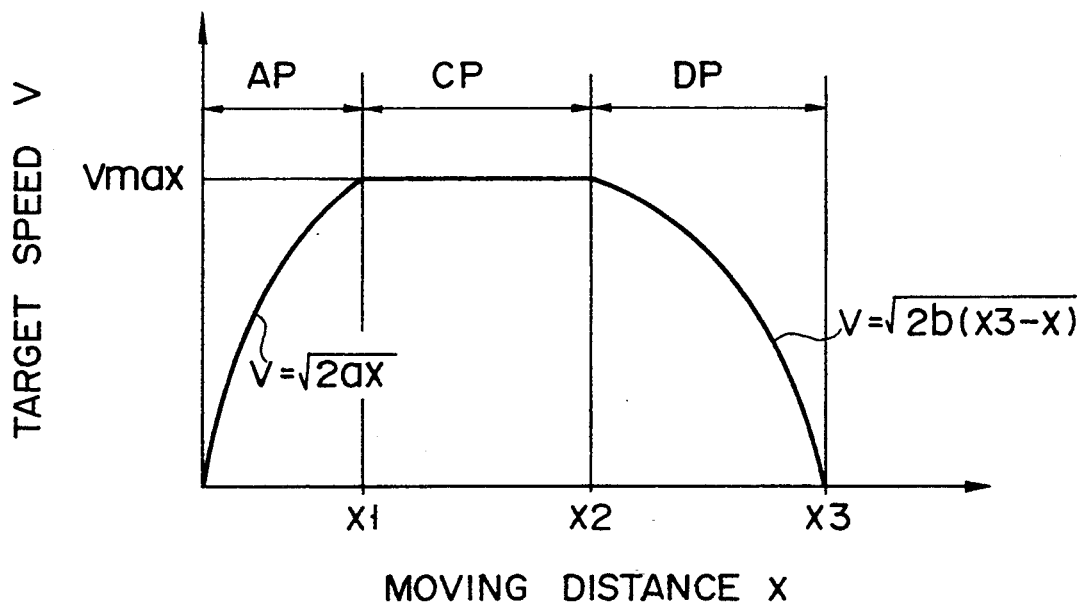
F I G. 2

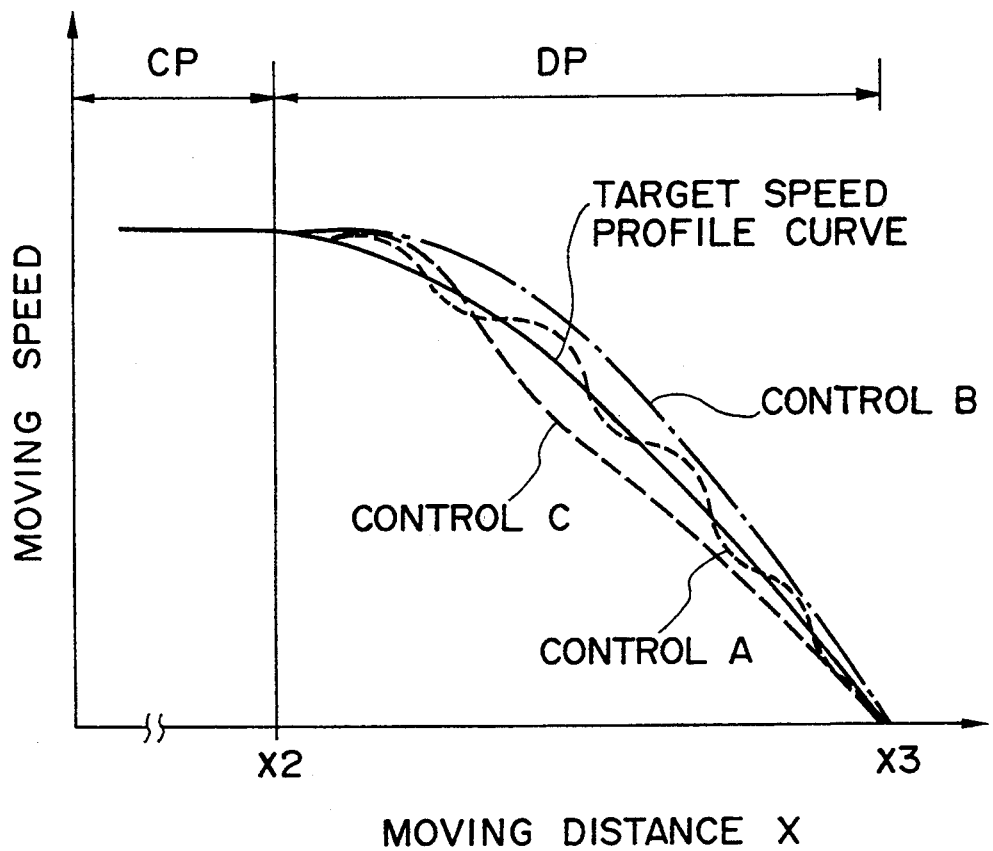
F I G. 3

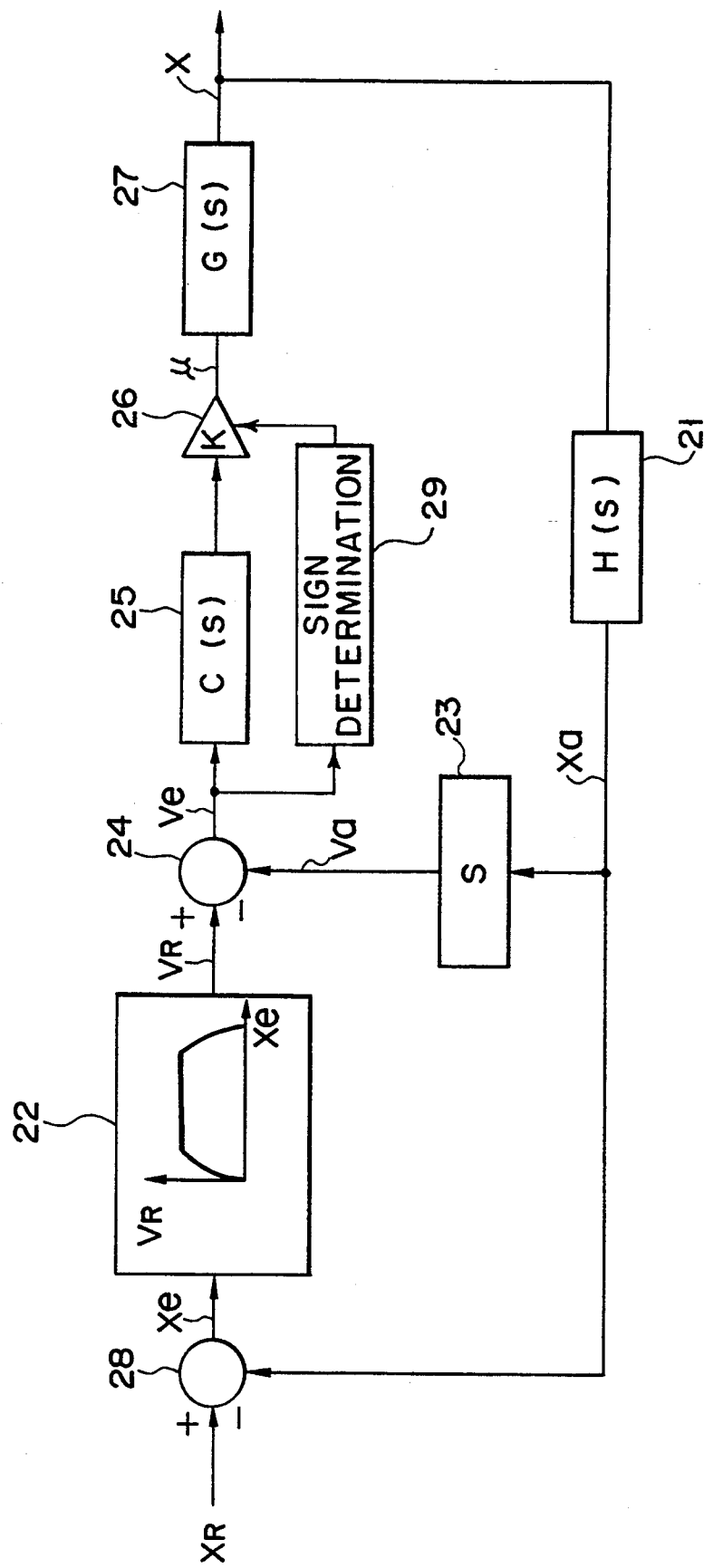
F I G. 4

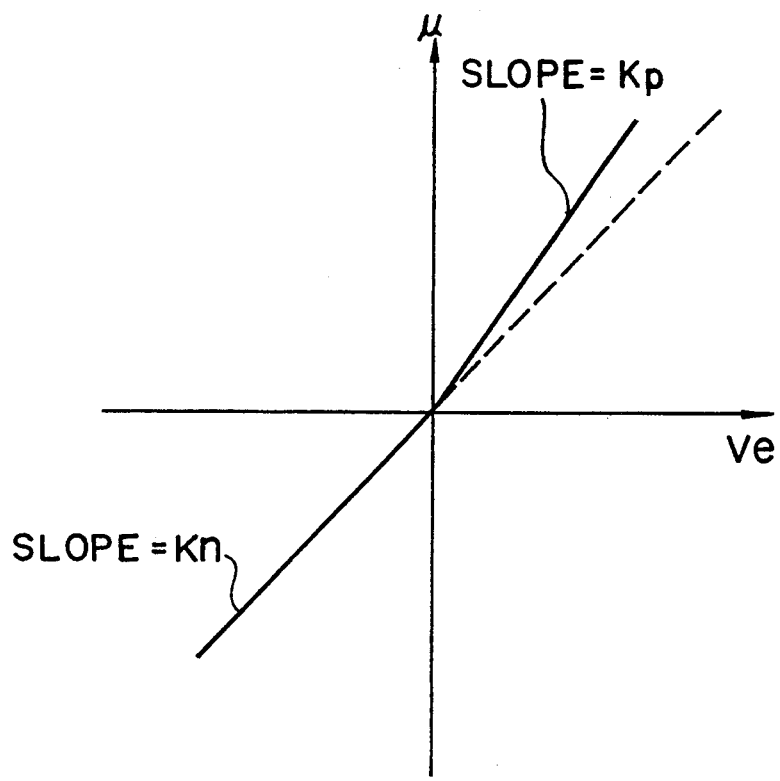
F I G. 5

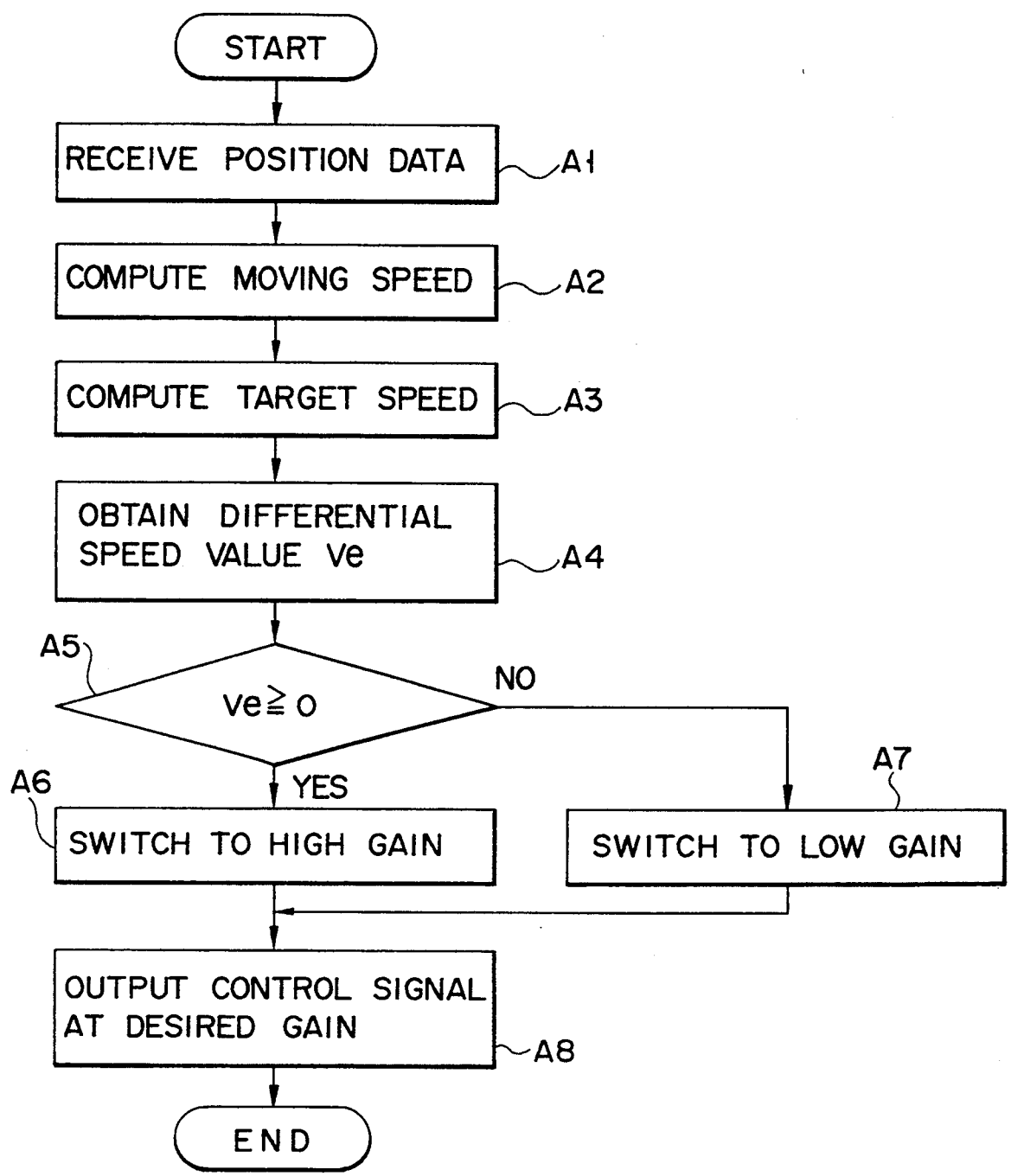
F I G. 7

CONTROLLING THE MOVING SPEED OF A MAGNETIC HEAD BY VARYING THE GAIN IN RESPONSE TO THE SIGN OF THE ERROR SIGNAL

BACKGROUND OF THE INVENTION

1. Field of the Invention

The present invention relates to an apparatus for controlling a moving speed of a magnetic head.

2. Description of the Related Art

Access control for moving a magnetic head of a magnetic disk apparatus to a target track and track following control for positioning the magnetic head in the center of the target track have conventionally been used as positioning control of the magnetic head. The access control is also called speed control since a moving speed of the magnetic head is controlled.

In the speed control, a target speed corresponding to a distance by which the magnetic head moves to the target track, is preset to make the actual moving speed of the magnetic head coincident with the preset target speed. More specifically, an actual moving speed value is obtained by sequentially detecting and computing the current positions of the magnetic head during the movement of the magnetic head, and a value obtained by subtracting the target speed value from the moving speed value, i.e., a differential speed value representing a difference between the moving speed value and target speed value is fed back to a speed control output. Closed-loop control is thus performed.

In the closed-loop control, the moving time of the magnetic head when the differential speed value is positive differs from that of the magnetic head when it is negative. When the differential speed value is positive, a period of time until the magnetic head reaches the target track after the magnetic head starts to move, i.e., the moving time is shorter than the target moving time. When the differential speed value is negative, the moving time is longer than the target moving time. Even though the precision of the speed control, that is, the absolute value of the differential speed value is the same, the moving time changes in accordance with the polarity of the differential speed value, and shortening and stabilization of the moving speed of the magnetic head according to the original object cannot be accomplished.

It is therefore desirable to provide an apparatus for controlling a moving speed of a magnetic head which is capable of stably moving the magnetic head and shortening the moving time thereof.

SUMMARY OF THE INVENTION

It is an object of the present invention to provide an apparatus for controlling a moving speed of a magnetic head.

According to one aspect of the present invention, there is provided a magnetic recording and reproducing apparatus comprising: a recording medium including servo data; head means for reading out the servo data from the recording medium; moving means for moving the head means over the recording medium; detecting means for detecting moving positions of the head means in accordance with the read out servo data; first acquiring means for acquiring a moving speed value in accordance with the detected moving positions; second acquiring means for acquiring a target speed value corresponding to a distance between a target position and the detected moving position; subtracting means for subtracting the moving speed value from the target speed value to obtain a difference speed value; determining means for determining whether or not the difference speed value is larger than zero to change a gain for the difference speed value; and control means for controlling the moving means in accordance with the changed gain.

According to another aspect of the present invention, there is provided a magnetic recording and reproducing apparatus comprising: a recording medium including servo data; head means for reading out the servo data from the recording medium; moving means for moving the head means over the recording medium; detecting means for detecting moving positions of the head means in accordance with the read out servo data; first acquiring means for acquiring a first moving speed value in accordance with the detected moving positions; second acquiring means for acquiring a first target speed value corresponding to a distance between a target position and the detected moving position; first subtracting means for subtracting the first moving speed value from the first target speed value to obtain a first difference speed value; third acquiring means for acquiring a second moving speed value in accordance with the detected moving positions; fourth acquiring means for acquiring a second target speed value corresponding to a moving time of the head means; second subtracting means for subtracting the second moving speed value from the second target speed value to obtain a second difference speed value; adding means for adding the first difference speed value to the second difference speed value at a desired ratio to obtain an added difference speed value; and control means for controlling the moving means in accordance with the added difference speed value.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view showing the relationship between the moving time and target speed of a magnetic head;

FIG. 2 is a view showing the relationship between the moving distance and target speed of the magnetic head;

FIG. 3 is a view showing the relationship between the target speed and the moving speed obtained by various types of control;

FIG. 4 is a view showing a speed control model according to the first embodiment of the present invention;

FIG. 5 is a view showing the gain characteristic of a gain controller of the speed control model shown in FIG. 4;

FIG. 7 is a flowchart showing the operation of a CPU of the speed control apparatus shown in FIG.

DETAILED DESCRIPTION OF THE PREFERRED EMBODIMENTS

Figure 6:
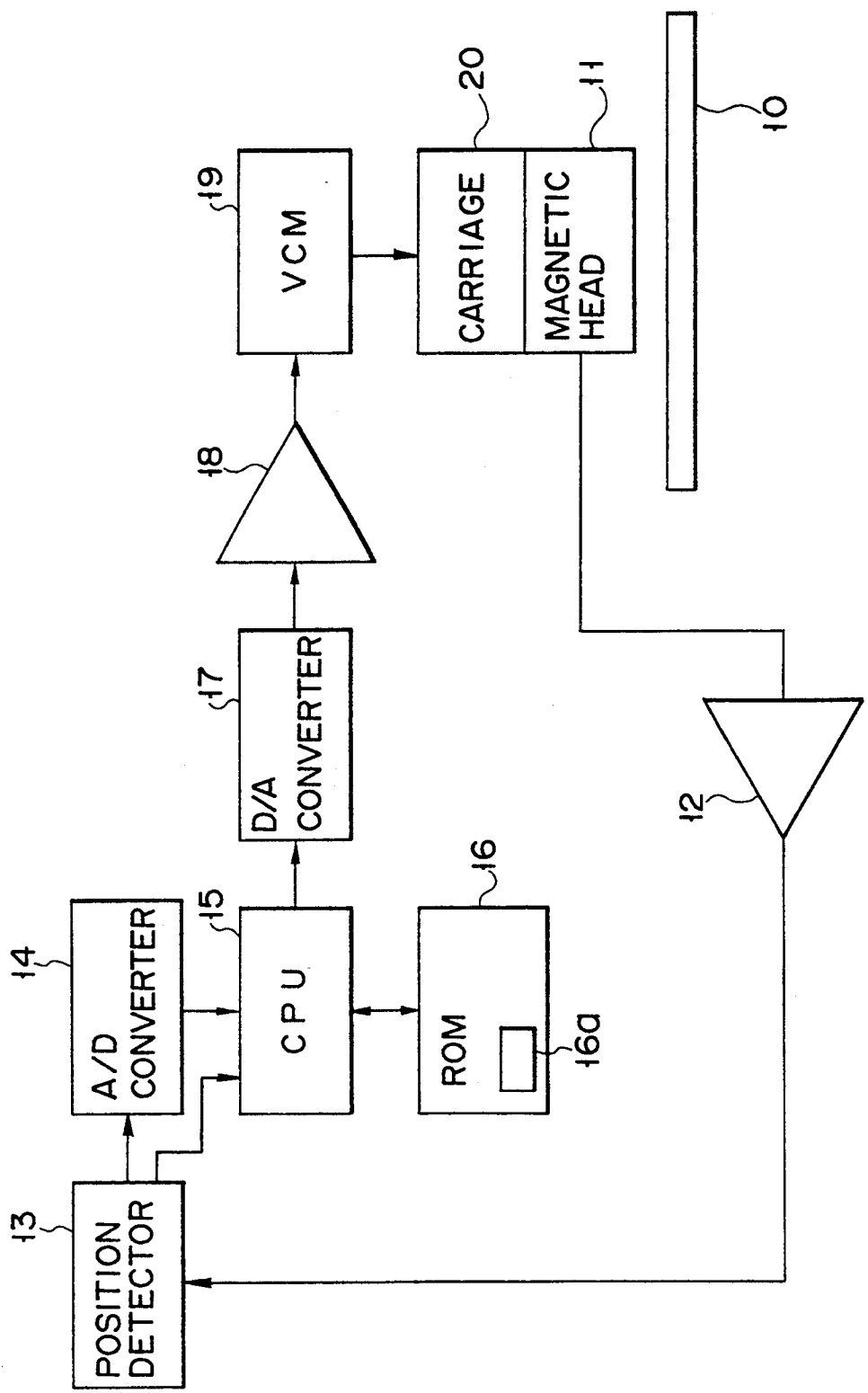
FIG. 6 is a view showing a speed control apparatus corresponding to the speed control model shown in FIG. 4.

A problem of speed control in positioning control of a magnetic head will be described before describing the embodiments of the present invention.

Speed control for moving a magnetic head of a magnetic disk apparatus to a target track and track following control for positioning the magnetic head in the center of the target track have been used as positioning control of the magnetic head. In the speed control, a target speed corresponding to a distance by which the magnetic head moves to the target track, is preset to make the actual moving speed of the magnetic head coincident with the preset target speed. A target speed curve, which is a function of the moving time or moving distance of the magnetic head, is called a speed profile curve. The speed profile curve is shown in FIGS. 1 and 2. In these figures, a and b indicate positive acceleration and negative acceleration, respectively. The speed of the magnetic head is controlled during acceleration period AP, constant-speed period CP and deceleration period DP, as shown in FIGS. 1 and 2.

During the acceleration period AP, the magnetic head is accelerated at positive constant acceleration a (corresponding to the maximum acceleration) until the moving speed of the magnetic head reaches a target speed Vmax of the constant-speed period CP. During the constant speed period CP, the target speed Vmax is maintained. During the deceleration period DP, the magnetic head is decelerated at negative constant acceleration b (corresponding to ½ to ⅓ of the maximum acceleration).

The magnetic head moves to a target track at the negative constant acceleration b during the deceleration period DP. By sequentially detecting the current positions of the magnetic head during the movement of the magnetic head, the actual moving speed value of the magnetic head is obtained, and a differential speed value representing a difference between the moving speed value and target speed value is fed back to a speed control output. Closed loop control is thus performed.

In the speed control, it is desirable to stably move the magnetic head at high speed until it reaches a target track. For example, as shown in FIG. 3, during the deceleration period DP of a target speed profile curve which is a function of a moving distance by which the magnetic head moves to the target track, control A causes the moving speed value of the magnetic head to repeatedly increase and decrease with respect to the target speed value. Control B causes the moving speed value to be larger than the target speed value, and control C causes the moving speed value to be smaller than the target speed value, except at the beginning of the deceleration period DP. The moving speed value thus varies, with respect to the target speed value, in accordance with the method of speed control. Moving time Ts of the magnetic head is represented by the following equations.

$$Ts = \int dt$$

$$= \int_0^{xo} dx/V(x)$$

$$\int_0^{xo} dx/(V0(x) + \Delta(x))$$

$$= \int_0^{xo} 1/V0(1/(1 + \Delta V/V0))dx$$

$$= \int_0^{xo} 1/V0(1 - (\Delta V/V0))dx$$

$$= \int_0^{xo} (1/V0)dx - \int_0^{xo} (\Delta V/V0)dx$$

$$= \text{(target moving time)} - \text{(differential moving time)}$$

where X0 is a position of the target track, V0 is the target speed, V is the moving speed, $\Delta V$ is the differential speed, i.e., V-V0, indicative of a difference between the target speed V0 and moving speed V.

As described above, when a value of the differential speed $\Delta V$ is positive, the moving time Ts representing a period of time until the magnetic head reaches the target track after the magnetic head starts to move, is shorter than the target moving time when the value of the differential speed $\Delta V$ is negative, the moving time Ts is longer than the target moving time. Even though the precision of the speed control, that is, the absolute value of the differential speed value is the same, the moving time changes in accordance with the polarity of the differential speed value. This is because the moving time of the magnetic head has not been conventionally used as a target value of the feedback control.

According to the present invention, in order to shorten and stabilize the moving time of a magnetic head, a gain against a control output is changed in accordance with the polarity of a differential speed value indicative of a difference between the target speed and moving speed in the acceleration period of the speed control. Further, the differential speed values for the moving distance and moving time are fed back to the control output.

The first embodiment of the present invention will be described.

The speed control model shown in FIG. 4 includes a position detecting section 21, a target speed producing section 22, a moving speed computing section 23, subtraction sections 24 and 28, a compensation filter section 25, a gain control section 26, and a controlled system 27.

The position detecting section 21 expressed by transfer function H(s) detects controlled variable X output from the controlled system 27 expressed by transfer function G(s). The moving speed computing section 23 computes a moving speed value Va on the basis of a moving position Xa output from the position detecting section 21. The subtraction section 28 obtains a difference between a target position XR and a moving position Xa, that is, the remaining moving distance Xe. The target speed producing section 22 produces a target speed value VR corresponding to the remaining moving distance Xe output from the subtraction section 28. The subtraction section 24 subtracts the moving speed value Va from the target speed value VR to obtain a differential speed value Ve representing a result of the subtraction. The compensation filter section 25 expressed by transfer function C(s) performs, for example, integral compensation operation and phase compensation operation with respect to the differential speed value Ve. The gain control section 26 controls a gain K with respect to the differential speed value Ve to supply a manipulated variable $\mu$ to the controlled system 27.

As is apparent from the gain characteristic of the gain control section 26 shown in FIG. 5, when the differential speed value Ve is larger than zero, i.e., when the moving speed value Va is smaller than the target speed value VR, the gain K of the gain control section 26 is set to Kp. When the differential speed value Ve is smaller than zero, i.e., when the moving speed value Va is larger than the target speed value VR, the gain K is set to Kn. Kp is larger than Kn.

When the moving speed value is smaller than the target speed value, the speed follow-up of the target speed can be improved by setting the gain K to the high gain Kp. When the moving speed value is larger than the target speed value, the speed follow-up can be stabilized.

In FIG. 6, a magnetic recording medium, i.e., a magnetic disk 10 is to be formatted to use a hard disk drive of sector servo type. That is, an upper and lower surfaces of the magnetic disk 10 correspond to a data record surface in which information is recorded. Tracks in which information is recorded at concentric circles are assigned to each data record surface, and each has a plurality of sectors. Each of the sectors has a servo area for prerecording servo information for positioning a magnetic head 11 and a data area for reading and writing data by a user. In the servo area, track address information representing an absolute position of a track on which the magnetic head 11 exists, and burst information for positioning the magnetic head 11 in the center of the track are prerecorded. After the burst information is read out from the magnetic disk 10 by the magnetic head 11, an analog signal corresponding to a shift distance between the center of the track and a position of the magnetic head 10 is obtained by signal processing. A voltage value of the analog signal represents a shift amount of the magnetic head 11, and the polarity of the analog signal represents a shift direction. The track address information is used in a speed control of the magnetic head 11, and the burst information is used in a track following control of the magnetic head 11. Note that detail description about burst information for positioning the magnetic head 11 refers to, for example, U.S. Pat. No. 4,794,469. The magnetic disk 10 is rotated by a spindle motor (not shown). An amplifier 12 amplifies a reproduced signal output from the magnetic head 11. A position detector 13 detects a track position (i.e., a track number) representing a current position of the magnetic head 11 in accordance with the track address information of the servo data included in the amplified reproduced signal, and outputs a signal representing the detected current position to a central processing unit (CPU) 15. The position detector 13 also outputs to analog/digital (A/D) converter 14 an analog signal corresponding to a shift amount for the center of the track on which the magnetic head exists in accordance with the burst information of servo data included in the amplified reproduced signal. The A/D converter digital-converts the shift amount of the magnetic head 11 for the center of the track in accordance with the analog signal and outputs a digital signal corresponding to the shift amount to the CPU 15.

A CPU 15 controls the entire apparatus, changes the gain in accordance with the polarity of the differential speed value, and performs compensation operation. A ROM 16 has a memory section 16a for storing data necessary for speed control. The memory section 16a previously stores speed data representing a target speed profile curve corresponding to the moving distance of the magnetic head 11. A digital-to-analog (D/A) converter 17 converts a control signal output from the CPU 15 into an analog signal. A power amplifier 18 amplifies the control signal converted into the analog signal.

A voice coil motor (VCM) 19 drives a carriage 20 in accordance with the control signal amplified by the power amplifier 18. The carriage 20 for supporting the magnetic head 11 is driven by the VCM 19 to move the magnetic head 11. Accordingly, the magnetic head 11 moves to a target track position of the recording medium 10.

An operation of the speed control apparatus shown in FIG. 6 will be described.

When data is read out from or written in the magnetic disk 10, the magnetic head 11 moves over the magnetic disk 10 toward the target track, and reads out the servo data previously recorded on the magnetic disk 10 during the movement. The servo data is input to the position detector 13 through the amplifier 12.

During the deceleration period of the speed control, the position detector 13 outputs to the CPU 15 position data (track address information) indicative of the track position corresponding to the current position of the magnetic head 11 from the servo data read out from the magnetic disk 10.

An operation of the CPU 15 will be described with reference to the flowchart shown in FIG. 7.

In step A1, the track address information of the position data is received from the position detector 13.

In step A2, the moving speed of the magnetic head 11 is computed based on the received position data. In other words, the position data is produced from the servo data read out from the magnetic disk 10 every sector time. During the movement of the magnetic head 11, the moving distance of the magnetic head 11 is obtained by subtracting two position data each other acquired by two servo data sequentially read out from the magnetic disk 10. The moving distance is divided by sampling time (one sector time) to compute a moving speed per one sector time.

In step A3, the number of the remaining tracks is obtained on the basis of the current track position of the magnetic head 11 and the position of the target track, and a target speed necessary for moving the magnetic head 11 by the distance corresponding to the number of the remaining tracks is computed on the basis of speed data representing the speed profile curve stored in the memory section 16a of the ROM 16.

In step A4, the moving speed value is subtracted from the target speed value to obtain a differential speed value Ve indicative of a result of the subtraction. The gain of the speed control is switched in accordance with whether the differential speed value Ve is positive or negative.

When the differential speed value Ve is larger than zero in step A5, that is, when the moving speed value is smaller than the target speed value, the high gain switching is performed (step A6), and a control signal u corresponding to the differential speed value Ve multiplied by a high gain Kh is output (step A8). That is, the control signal u represents Kh.Ve.

When the differential speed value Ve is smaller than zero in step A5, that is, when the moving speed value is larger than the target speed value, the low gain switching is performed (step A7), and a control signal u corresponding to the differential speed value Ve multiplied by a low gain K1 is output (step A8). That is, the control signal u represents K1.Ve.

The control signal output from the CPU 15 is converted into an analog signal by the D/A converter 17, then amplified by the power amplifier 18, and supplied to the VCM 19.

As described above, when the moving speed value is smaller than the target speed value, a period of time that the moving speed value is smaller than the target speed value can be shortened by the high gain control signal. When the moving speed value is larger than the target speed value, a long period of time that the moving speed value is larger than the target speed value can be maintained by the low gain control signal. Therefore, if the gain of the speed control is switched in accordance with whether the differential speed value is positive or negative, the moving time of the magnetic head can be shortened.

The second embodiment of the present invention will be next described.

Figure 8:
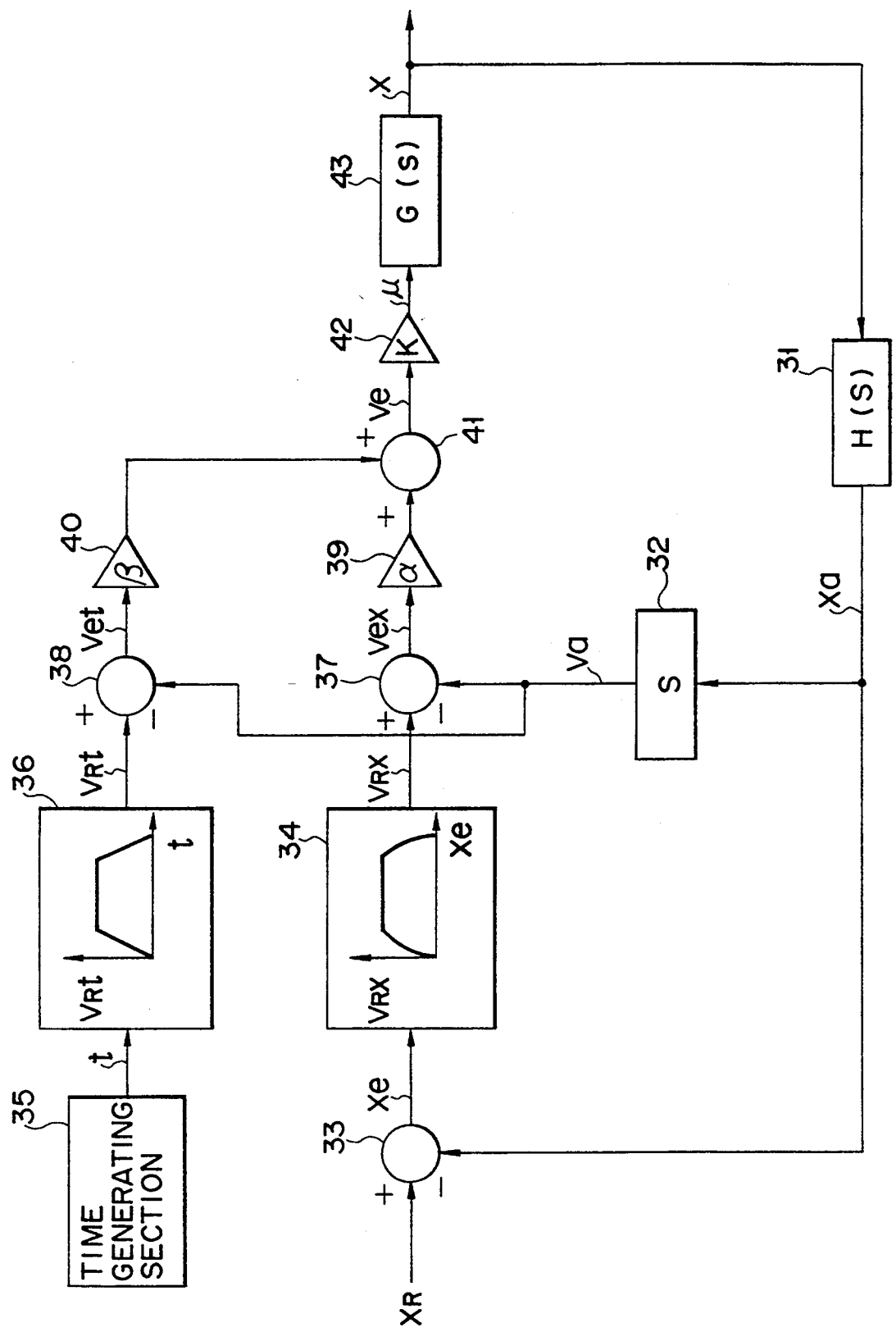
FIG. 8 is a view showing a speed control model according to the second embodiment of the present invention.

The speed control model shown in FIG. 8 comprises a position detecting section 31, a moving speed computing section 32, subtraction sections 33, 37 and 38, target speed producing sections 34 and 36, a time generating section 35, gain control sections 39, 40 and 42, an addition section 41, and a controlled system 43.

The position detecting section 31 expressed by transfer function H(s) detects controlled variable X output from the controlled system 43 expressed by transfer function G(s). The moving speed computing section 32 computes a moving speed value Va on the basis of a moving position Xa output from the position detecting section 31. The subtraction section 33 obtains a difference distance between a target position XR and a moving position Xa, that is, the remaining moving distance Xe. The target speed producing section 34 produces a target speed value VRX corresponding to the remaining moving distance Xe. The time generating section 35 generates elapsed time t from the start of movement of the magnetic head. The target speed producing section 36 produces a target speed value VRt corresponding to the elapsed time t. The subtraction section 37 obtains a differential speed value Vex representing a difference between a target speed value VRx from the target speed producing section 34 and a moving speed value Va from the moving speed computing section 32. The subtraction section 38 obtains a differential speed value Vet representing a difference between a target speed value VRt from the target speed producing section 36 and a moving speed value Va from the moving speed computing section 32. The gain control section 39 multiplies a differential speed value Vex from the subtraction section 37 by $\alpha$. The gain control section 40 multiplies a differential speed value vet from the subtraction section 38 by $\delta$. The addition section 41 adds the differential speed value Vex multiplied by a by the gain control section 39 and a differential speed value Vet multiplied by $\delta$ by the gain control section 40 to obtain an added differential speed value Ve indicative of a result of the addition. The gain control section 42 controls a gain K with respect to the added differential speed value Ve to supply a manipulated variable $\mu$ to the controlled system 43.

As described above, if the differential speed value vex obtained as a function of the moving distance and the differential speed value vet obtained as a function of the moving time are added to each other in a predetermined ratio and the gain K is controlled with respect to the added differential speed value Ve representing a result of the addition, the moving time of the magnetic head can be shortened. The reason is as follows. In the speed control, it is advisable to move the magnetic head to a target track for a short time. Conventionally, however, the speed control is performed so that the actual moving speed of the magnetic head coincides with the target speed obtained on the basis of only the moving distance of the magnetic head. When the moving speed value is larger than the target speed value, the speed control is performed so as to decrease the moving speed value, though the magnetic head can fast reach the target track. Therefore, the moving time of the magnetic head is increased.

Since the speed control according to the moving time as well as the moving distance is performed in the second embodiment, as described above, even if the moving speed value is smaller than the target speed value, the moving speed value in the speed control according to the present invention is not smaller than that in the conventional control. Therefore, since the speed control is performed so as to coincide the moving time of the magnetic head with the target moving time, shortening and stabilization of the moving speed can be accomplished.

Figure 9:
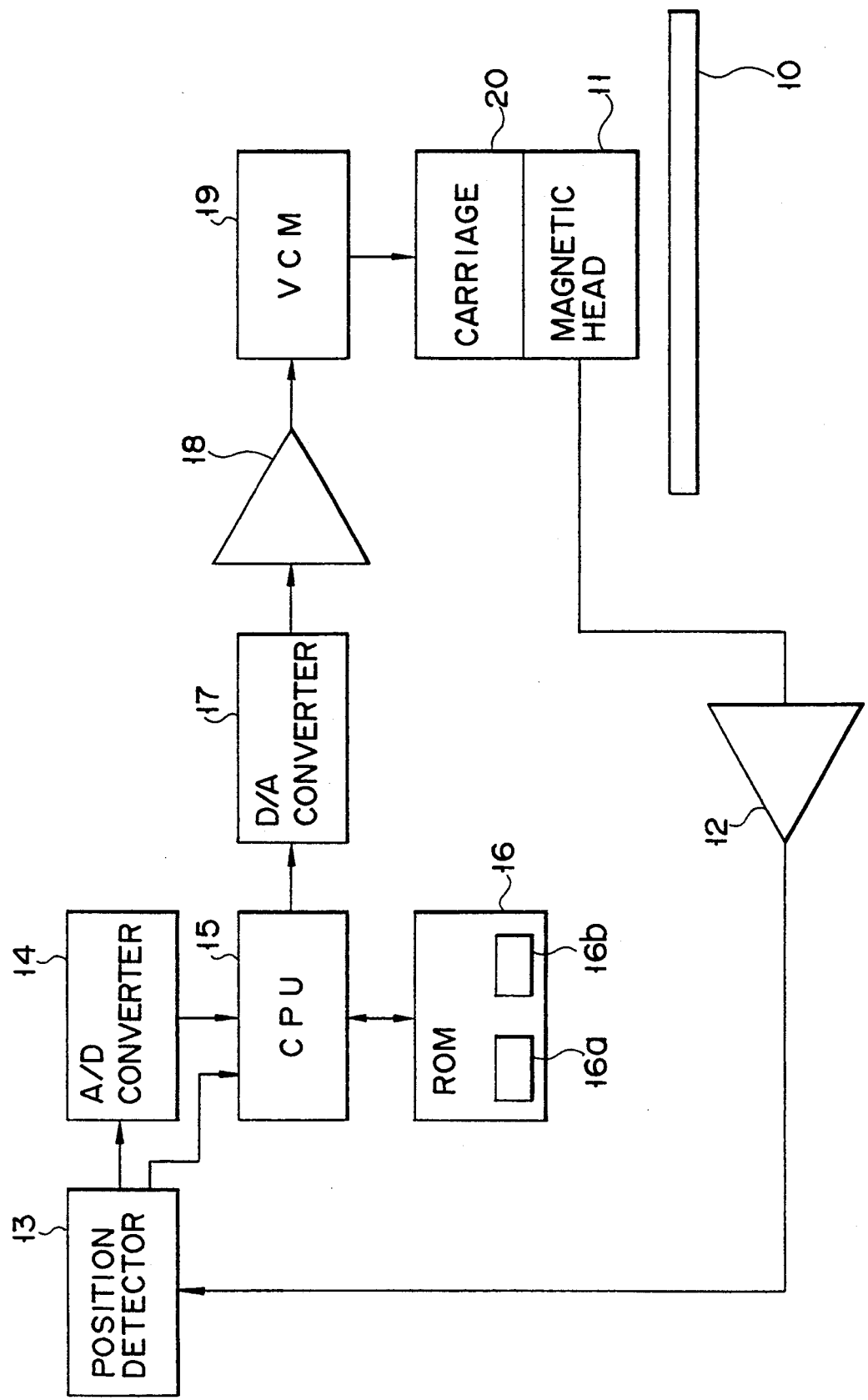
FIG. 9 is a view showing a speed control apparatus corresponding to the speed control model shown in FIG. 8.

FIG. 9 illustrates a speed control apparatus corresponding to the speed control model shown in FIG. 8. As compared with the apparatus shown in FIG. 6, the ROM 16 includes a memory section 16b in addition to the memory section 16a, and a target speed is obtained on the basis of both a speed profile curve corresponding to a moving distance by which the magnetic head moves to the target track, and a speed profile curve corresponding to the elapsed time from the start of movement of the magnetic head. Speed data indicative of the speed profile curve corresponding to the elapsed time is stored in the memory section 16b.

Figure 10:
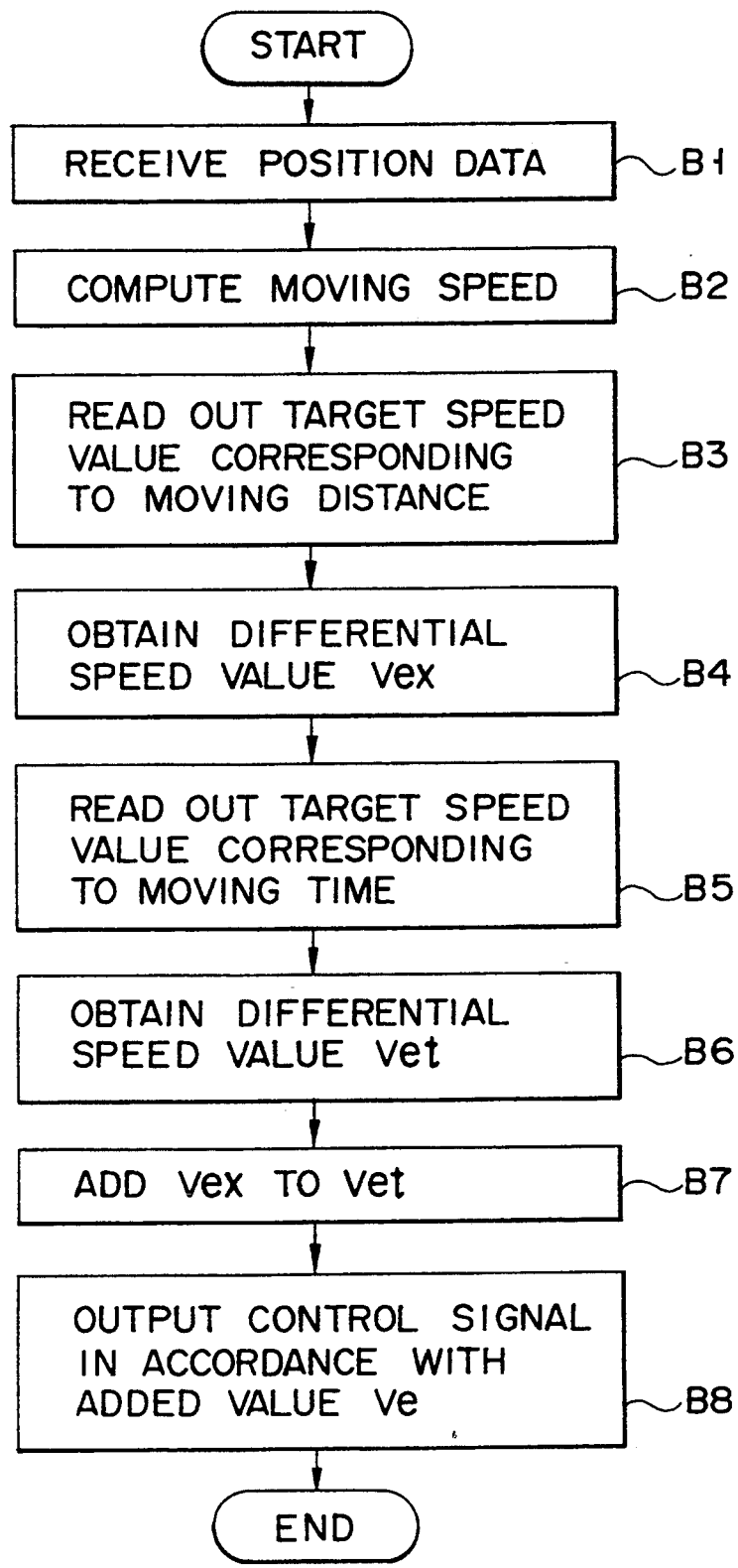
FIG. 10 is a flowchart showing the operation of a CPU of the speed control apparatus shown in FIG. 9.

An operation of the CPU 15 in the speed control apparatus shown in FIG. 9 will be described with reference to the flowchart shown in FIG. 10.

In step B1, position data for each sector time is received from the position detector 13 through the A/D converter 14 during the deceleration period of the speed control.

In step B2, a moving speed of the magnetic head 11 is computed based on the received position data.

In step B3, a target speed value corresponding to a distance by which the magnetic head moves to a target track, is read out from the memory section 16a of the ROM 16 on the basis of the received position data. In step B4, a differential speed value vex representing a difference between the read out target speed value and computed moving speed value is obtained.

In step B5, a target speed value corresponding to the elapsed time from the start of the movement of the magnetic head 11 is read out from the memory section 16b of the ROM 16 on the basis of the received position data. In step B6, a differential speed value Vet representing a difference between the read out target speed value and computed moving speed value is obtained.

In step B7, the differential speed values vex and Vet are added to each other in a predetermined ratio of, e.g., $\alpha:\delta = 1:1$, and an added differential speed value Ve indicative of a result of the addition is obtained. In step B8, a control signal u corresponding to the added differential speed value Ve multiplied by a gain K is output. That is, the control signal u represents K.Ve.

The output control signal is converted into an analog signal by the D/A converter 17, then amplified by the power amplifier 18, and supplied to the VCM 19.

As compared with the conventional speed control in which the target speed curve is a function of only a moving distance of the magnetic head to the target track, in the second embodiment of the present invention, the moving time of the magnetic head can be shortened and stabilized by the speed control in which the target speed curve is a function of not only the moving distance but also the elapsed time from the start of the movement of the magnetic head.

The present invention is not limited to a system in which servo data is recorded on the same recording medium as a recording medium on which read/write data is recorded but can be applied to a system is which read/write data and servo data are recorded on different recording mediums.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims and their equivalents.

What is claimed is:

1. A magnetic recording and reproducing apparatus comprising:

a recording medium including servo data;

head means for reading out the servo data from the recording medium;

moving means for moving the head means over the recording medium;

detecting means for detecting moving positions of the head means in accordance with the read out servo data;

first acquiring means for acquiring a moving speed value in accordance with the detected moving positions;

second acquiring means for acquiring a target speed value corresponding to a distance between a target position and the detected moving position;

subtracting means for subtracting the moving speed value from the target speed value to obtain a difference speed value;

determining means for determining a gain responsive to the sign of the difference speed value, the gain having a first value when the difference speed value is positive and a second value when the difference speed value is negative, the first value being greater than the second value; and control means for controlling the moving means to have a moving speed affected by the determined gain.

2. A method of controlling a moving speed of a head means in accordance with servo data recorded into a recording medium, the method comprising the steps of:

reading out the servo data from the recording medium;

moving the head means over the recording medium;

detecting moving positions of the head means in accordance with the read out servo data;

acquiring a moving speed value in accordance with the detected moving positions;

acquiring a target speed value corresponding to a distance between a target position and the detected moving position;

subtracting the moving speed value from the target speed value to obtain a difference speed value;

determining a gain responsive to the sign of the difference speed value, the gain having a first value when the difference speed value is positive and a second value when the difference speed value is negative, the first value being greater than the second value; and controlling the moving speed of the head means by the determined gain.

* * * * *